United States Patent [19]

Heisler et al.

[11] Patent Number: 5,983,313
[45] Date of Patent: *Nov. 9, 1999

[54] EDRAM HAVING A DYNAMICALLY-SIZED CACHE MEMORY AND ASSOCIATED METHOD

[75] Inventors: Doyle James Heisler, Colorado Springs; James Dean Joseph, Monument; Dion Nickolas Heisler, Colorado Springs, all of Colo.

[73] Assignee: Ramtron International Corporation, Colorado Springs, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,489

[22] Filed: Apr. 10, 1996

[51] Int. Cl.[6] ............................. G06F 12/00; G06F 12/06; G06F 13/00

[52] U.S. Cl. .............................. 711/105; 711/3; 711/118; 711/134; 711/136; 711/160; 365/189.05

[58] Field of Search ........................ 364/DIG. 1, 243.4; 711/105, 136, 160, 118, 134, 3, 119; 365/189.05

[56] References Cited

U.S. PATENT DOCUMENTS

| | | |
|---|---|---|
| 3,806,883 | 4/1974 | Weisbecker . |
| 4,115,855 | 9/1978 | Chiba ....................................... 711/160 |
| 4,361,878 | 11/1982 | Lane . |
| 4,422,145 | 12/1983 | Sacco et al. ............................. 711/160 |
| 4,511,994 | 4/1985 | Webb et al. ............................. 711/160 |
| 5,184,320 | 2/1993 | Dye ......................................... 711/118 |
| 5,226,139 | 7/1993 | Fujishima et al. ...................... 711/118 |
| 5,339,268 | 8/1994 | Machida ..................................... 365/49 |
| 5,353,429 | 10/1994 | Fitch ........................................ 711/118 |
| 5,526,511 | 6/1996 | Swenson et al. ........................ 711/134 |
| 5,530,833 | 6/1996 | Iyengar et al. .......................... 711/118 |
| 5,530,834 | 6/1996 | Colloff et al. ........................... 711/136 |
| 5,539,892 | 7/1996 | Reiminger et al. ...................... 711/159 |
| 5,542,066 | 7/1996 | Mattson et al. .......................... 711/136 |
| 5,544,121 | 8/1996 | Dosaka et al. ........................... 365/222 |
| 5,566,324 | 10/1996 | Kass ......................................... 711/160 |
| 5,584,013 | 12/1996 | Cheong et al. .......................... 711/122 |
| 5,594,886 | 1/1997 | Smith et al. ............................. 711/136 |

Primary Examiner—Tuan V. Thai
Attorney, Agent, or Firm—William J. Kubida; Holland & Hart LLP

[57] ABSTRACT

The method and apparatus of the current invention relates to an intelligent cache management system for servicing a main memory and a cache. The cache resources are allocated to segments of main memory rows based on a simple or complex allocation process. The complex allocation performs a predictive function allocating scarce resources based on the probability of future use. The apparatus comprises a main memory coupled by a steering unit to a cache. The steering unit controls where in cache a given main memory row segment will be placed. The operation of the steering unit is controlled by an intelligent cache allocation unit. The unit allocates new memory access requests cache locations which are least frequently utilized. Since a given row segment may be placed anywhere in a cache row, the allocation unit performs the additional function of adjusting the column portion of a memory access request to compensate for the placement of the requested segment in the cache. The allocation unit accepts as input hit or miss information from page segment comparators greater than or equal to in number the number of segments of cache.

7 Claims, 8 Drawing Sheets

EDRAM HAVING A DYNAMICALLY-SIZED CACHE MEMORY AND ASSOCIATED METHOD

BACKGROUND OF THE INVENTION

1. Field of the Invention

The present invention relates to the field of computer systems and to memory systems for use therein. More particularly the present invention relates to a method and apparatus for dynamically allocating a portion of main memory within a variable amount of cache memory.

2. Description of Related Art

The performance of computer central processing units (CPU's) has increased dramatically in recent years and has far exceeded that of any corresponding increase in the performance of main memory DRAM. Not until the introduction of cache memory, was the performance of systems with DRAM main memory improved. This performance improvement was achieved by making a high speed, locally accessed copy of memory available to the CPU so that even during memory accesses the CPU would not always need to operate at the slower speeds of the system bus and the main memory DRAM. This method of copying memory is referred to as caching a memory system, and is a technique made possible by virtue of the fact that much of the CPU access, as determined by the computer source code, is in highly repetitive address spaces, which once copied from memory to cache can be utilized through many bus cycles before needing to be updated with the next address block. This method of memory copying is advantageous on the read cycles of the computer, which studies have shown, in contrast to the write cycles, constitute about 90% of the external accesses of the CPU.

The most popular hardware realization of a cache memory incorporates a high speed SRAM cache and a slow but less expensive DRAM main memory. A proprietary enhanced DRAM (EDRAM) chip developed by Ramtron International Corporation, 1850 Ramtron Drive, Colorado Springs, Colo. 80921, incorporates both these memories on one chip. Access to the chip is provided by a single bus. The product line is outlined in that company's "Specialty Memory Products Data Book," October, 1994, which is herein incorporated by reference.

Caching implementation to date has involved a full DRAM main memory implementation with a separate SRAM cache feature, usually this latter on the local bus and the former on a system bus, or a full EDRAM implementation with the EDRAM connected to the system bus. In either implementation a row of main memory maps to a full row of cache irregardless of the uniformity of memory access demands across the cached row.

To date there has been no caching system which allocates scarce cache resources on the basis of the probability of demand. This fact ends up retarding development of low cost hybrid main memory systems. What is needed is a way to combine main memory with an intelligently managed cache resource.

SUMMARY OF THE INVENTION

The method and apparatus of the current invention relate to an intelligent cache management system for servicing a computer DRAM main memory and an SRAM cache.

The location and size of the application code and data can vary depending on how many active tasks there are, and how much processor time each task requires. Therefore, the optimum memory architecture is one that allows fast access to multiple segments of data or code, no matter where it is in main memory. This can be accomplished by storing frequently used memory segments in cache memory banks. Unfortunately, today's memory subsystems do not match very well with multitasking operating systems. The unfortunate part of the typical memory subsystem is that there is only one cache organization for the entire main memory. The dynamic cache sizing memory architecture solves this problem by not only incorporating multiple SRAM caches for the main memory but also providing a means to reconfigure them.

The principal idea is to allow a cache page to contain data from anywhere within the DRAM array, and allow the size of the page to be one of two or more widths. The scarce cache resources are allocated to segments of main memory rows based on a simple or complex allocation process. The simple allocation mode allocates cache resources on a last in first out basis. The complex allocation mode maintains statistics on each cache segment. In a preferred embodiment, counters on each cache segment record the frequency of utilization of the segment. Replacement of an existing segment with a new area of main memory is based on the frequency of utilization of all existing cache segments. The segment with the least frequent utilization is replaced first. This complex mode, therefore, performs a predictive statistical allocation function, allocating scarce resources based on the probability of future use.

The apparatus of the current invention comprises a DRAM main memory coupled by a steering unit to an SRAM cache. The steering unit controls where in SRAM cache a given DRAM row segment will be placed. The operation of the steering unit is controlled by an intelligent cache allocation unit. The unit allocates new memory access requests to cache locations which are least frequently utilized. Since a given row segment may be placed anywhere in a cache row, the allocation unit performs the additional function of adjusting the column portion of a memory access request to compensate for the placement of the requested segment in the cache. The allocation unit accepts as an input hit or miss information from a plurality of page segment comparators greater than or equal to in number the number of segments of cache.

In operation a read request is analyzed by the page segment comparators and a determination is made as to whether the data requested is present in the SRAM cache. If the data is not available, then the cache allocation unit replaces a current cache segment with the newly requested data which is uploaded from DRAM memory and directed into the appropriate cache segment by the steering unit. The choice of the cache segment to replace is based on either the above-mentioned simple or complex replacement mode. Alternately, if a DRAM read request is determined by the page segment comparators to be present in the SRAM cache, then the cache allocation unit makes the appropriate column adjustment to account for the variable placement of the requested segment in cache and the data is read from that segment.

When a write request is analyzed by the page segment comparators and a determination is made that the address to be written to in DRAM main memory is also presently in cache, the cache allocation unit adjusts the steering unit so that as data is being written to DRAM it is also utilized to update stale data in the appropriate cache segment thus maintaining cache coherency. Alternately, if the address has not been copied to cache, then the write request is only directed to DRAM in which the appropriate row is updated.

BRIEF DESCRIPTION OF THE DRAWINGS

A better understanding of the present invention can be obtained when the following detailed description of the preferred embodiment is considered in conjunction with the following drawings in which.

DETAILED DESCRIPTION

The invention comprises a cache allocation unit and a segmented cache. The cache allocation unit is connected to page segment comparators which map an incoming address to a portion of a cache row. This allocation allows for scarce cache resources to be utilized efficiently to maximize the number of hits and to tightly pack the most densely accessed regions of memory into the cache while avoiding uploading wide rows containing memory addresses that may be only infrequently accessed.

Figure 1:
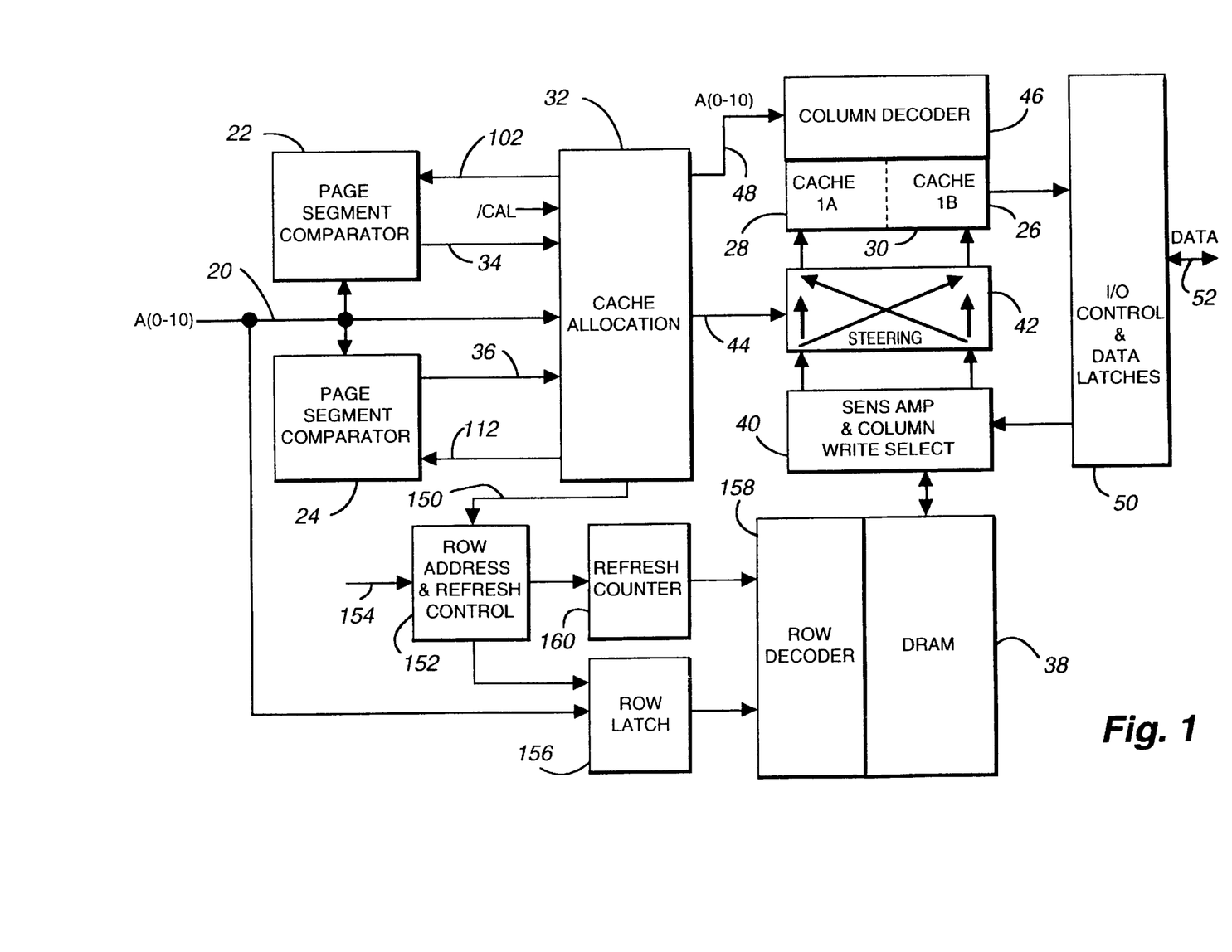
FIG. 1 is a hardware block diagram of an intelligent cache allocation unit and segment comparator coupled to cache and main memory.

The dynamic allocation of cache is embodied in hardware shown generally in FIG. 1, in which an address line 20 is provided to page segment comparators 22 and 24. Page segment comparators 22 and 24 determine with respect to an incoming address not only what row the address pertains to but also what segment of the cache the incoming column falls within. Both page segment comparators 22 and 24 communicate with a cache allocation unit 32 along signal lines 34 and 36, respectively.

Cache allocation unit 32 is responsible for uploading a given memory area from DRAM memory array 38 through sense amplifiers 40 to steering unit 42 and into the appropriate cache segment 28 or 30. Cache allocation 32 controls steering unit 42 via a signal line 44.

Cache allocation unit 32 is additionally responsible for directing column decoder 46 via signal line 48 to make the adjustment appropriate to the incoming column address to account for the specific cache segment 28 or 30 into which the cache allocation unit has placed the section of DRAM memory. This assures that during a column access to the cache, the appropriate data will be sent out through I/O control 50 to system data lines 52.

Page Segment Comparators: Uploading

Figure 2:
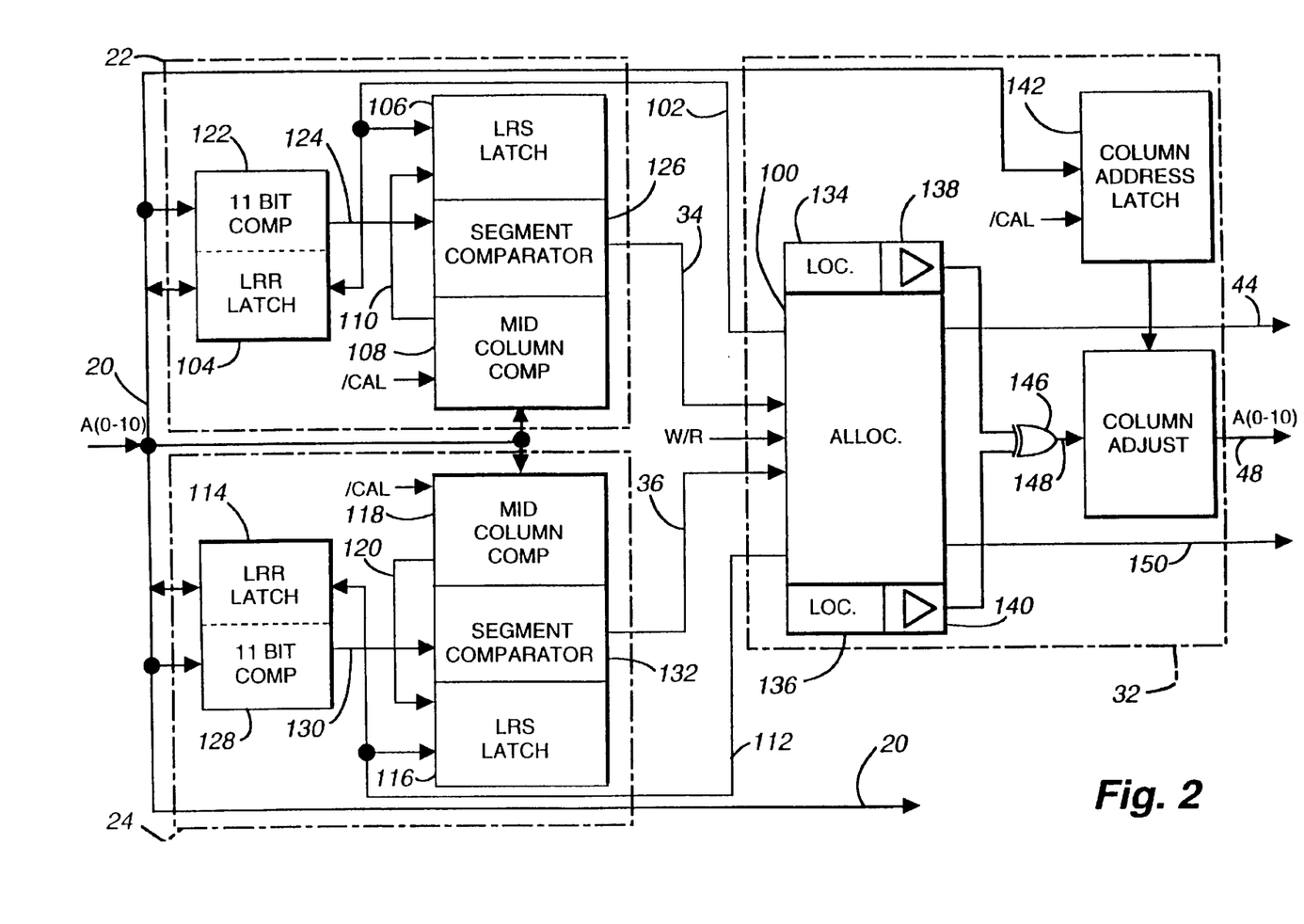
FIG. 2 is a detailed hardware block diagram of the intelligent cache allocation unit and segment comparator of FIG. 1.

The hardware connected with the operation of page segment comparators 22 and 24 and cache allocation unit 32 is shown in greater detail in FIG. 2. Page segment comparators 22 and 24 have identical components and are functionally responsible for uploading a row and row segment address, and detecting subsequent memory access requests directed to these row and segment addresses. The operation of page segment comparators 22 and 24 is identical and is as follows. During a memory access, a multiplexed address is presented on address line 20. The address takes the form of a row and a column within the row, and the address is decoded by means of a CAL signal well-known in the prior art for detecting the transition from a row portion to a column portion of the address. Page segment comparators 22 and 24 are capable of latching a row portion and a row segment portion. The distinction between a row segment portion and a column should be noted. A row segment portion indicates a series of columns within a given row segment. A row segment indicates a portion of a row; for example, in the embodiment illustrated two row segments exist, one providing a first section of the row, the other a second section. More specifically, in the embodiment illustrated, the cache 26 is split into two halves or segments 28 and 30. In response to a determination made by allocator 100, either page segment comparator 22 or 24 can be directed to upload a row and a row segment.

With respect to page segment comparator 22, uploading proceeds as follows. A signal is sent by allocator 100 along signal line 102 to last row read latch 104 and last row segment latch 106. In response to the signal, the last row read latch 104 uploads the row currently available during the memory access via address line 20. Once a CAL signal has been detected by mid-column comparator 108, the column comparator registers a greater-than or equal-to signal if the column portion of the current memory access falls within the second half of the row and a less-than signal if the column portion of the current memory access falls within the first half of the row. This signal is sent on column segment signal line 110 to last row segment latch 106 and is latched into that hardware.

In the case of page segment comparator 24, the uploading process proceeds as follows. A signal received from allocator 100 via signal line 112 by last row read latch 114 and last row segment latch 116 initiates the uploading process. Last row read latch 114 latches the row segment of the current memory access request received via address bus 20. Last row segment latch 116 receives a signal from mid-column comparator 118 via signal line 120. The mid-column comparator 118 synchronized with the multiplexed address via CAL line determines whether the column portion of the current memory access request falls within the first or second half of the row. In the event the column portion of the current memory access falls within the first portion of the row, a less-than signal is sent via signal line 120 to last row segment latch 116. In the event the column portion of the current memory access falls within the second half of the row, a greater-than or equal-to signal is sent from mid-column comparator 118 via signal line 120 to last row segment latch 116. Last row segment latch 116 then latches the signal contents.

The segmentation of memory access request as to not only a row but a segment within a row allows for more efficient utilization of limited cache resources. The page segment comparators will at least equal in number the available cache segments. In this case cache 26 has been split into only two segments: 28 and 30. The page segment comparators will indicate the contents of cache. They will not indicate the location of those contents within cache. That determination is made by allocator 100 as will be discussed shortly. Last row read latches 104 and 114 may occasionally contain different segments of the same row, if memory access requests not only were redundant with respect to row but were equally dispersed with respect to the segments within that row. Alternately, last row read latches 104 and 114 would more normally, in a multitask environment, contain different rows.

Page Segment Comparators: Comparison

The comparison process begins within the page segment comparator 22. An eleven-bit comparator 122 is connected to last row read latch 104 and to address bus 20. With each memory access request, a comparison is performed by the eleven-bit comparator 122 between the row portion of the current memory access and the contents of last row read latch 104. The result of this comparison is sent via signal line 124 to a segment comparator 126. The segment comparator 126 is connected to both last row segment latch 106 and mid-column comparator 108.

A row segment hit requires two independent determinations. First, there must be a hit at the row level as indicated by eleven-bit comparator 122 via signal line 124. Second, there must be a row segment hit as indicated by a comparison performed by segment comparator 126 between the contents of last row segment latch 106 and mid-column comparator 108. In the event both these comparisons are affirmative, then a row segment hit signal is sent via signal line 34 to allocator 100.

The comparison process of the page segment comparator 24 is identical to that of the above described page segment comparator 22 and proceeds as follows. With each memory access request, a comparison is performed by eleven-bit comparator 128 between the contents of last row read latch 114 and the row portion of the current memory access request received via address bus 20. The result of this comparison is sent via signal line 130 to segment comparator 132. Simultaneously, segment comparator 132 performs a comparison between the contents of mid-column comparator 118 and last row segment latch 116. If both determinations are affirmative, i.e., that a row hit has been indicated by eleven-bit comparator 128 and a segment hit has been indicated by a comparison of mid-column comparator 118 and last row segment latch 116, then a row segment hit is sent via signal line 36 to allocator 100.

Cache Segment Allocation

In the process of cache segment allocation and the hardware connected therewith and the adjustment of column addressing to correspond with variable row segment location in cache, the allocator 100 controls the page segment comparator latches via latching control lines 102 and 112 and has input from page segment comparators hit/miss row segment comparators lines 34 and 36. Additional inputs to allocator 100 includes the read/write signal line, which enables allocator 100 to be apprised of the nature of the current memory access request. The allocator 100 also receives as input the contents of location registers 134 and 136. The location registers 134 and 136, affiliated respectively with page segment comparators 22 and 24, indicate in which portion of cache 26 the page segments reside.

The allocator 100 loads new locations into location register 134 and uploads new locations into location register 136 via location register and control lines 140. The allocator 100 determines when the contents of location registers 134 and 136 are output through transmission buffers 138 and 140 respectively. There are two additional output functions of the allocator 100. The first provides a steering function between the allocator 100 and the data steering unit 42. This steering operation is controlled via signal line 44 linking the allocator 100 to the steering unit 42. Via this signal line 44, allocator 100 is able to steer the contents of a row of DRAM 38 or a row of data present on data bus 52 to either cache segments 28 and 30 or to disable access to the cache. Another output function of the allocator 100 is a column adjustment. Since a first half of a row of memory may be written in the second half of a cache row and the second half of a row of memory may be written to the first half of a cache row, it is necessary that the allocator adjust the column portion of the current memory access request to account for the placement of a given row segment in cache 26.

Column Adjustment

Generally, if the cache segment allocated to the current row segment corresponds to the placement of the segment within the row, then no adjustments of the column portion of the current address will be required. Alternately, if the location of the current row segment is displaced within cache, i.e, if the first segment of the row is placed within the second segment of cache 26, then it will be necessary to perform an adjustment on the column address portion of the current memory access request in order that the contents of the cache be properly provided in response to a cache hit to data bus 52.

Column address latching and adjustment hardware comprises the following. A column address latch 142 is connected to multiplex address bus 20 and synchronized to the column portion of that address via column address latch /CAL line. In a manner well-known in the prior art, the column is latched into that register. An additional piece of hardware is interspersed between that register and column decoded 46, specifically column adjust register 144. Column adjust register 144 accepts input from and is capable of up/down incrementing column address latch 142 and has an output connected via address line 48 to column decoder 46. The adjustment value present within column adjust register 144 is determined by allocator 100. Column adjust 144 contains an adjustment value related to the contents of location register 134 and 136 as provided to it via signal line 148 at the direction of allocator 100.

The final output of allocator 100 is signal line 150. Signal line 150 is one of the inputs presented to row address and refresh control 152 shown on FIGS. 1, 4, 5, 6, 7. The row address in refresh control circuit 152 receives as inputs signal line 150, and in addition, system control signal 154 described and well-known in the prior art as comprising the refresh signal /F, the row enable signal /RE, and the read/write signal W/R. In response to these signal inputs 150, 154, row address and refresh control 152 may direct row latch register 156 to latch in the current row present on multiplex address line 20. This row latch register is directly coupled to row decoder 158 which is in turn coupled to DRAM memory array 38. Additionally, as discussed in the above-mentioned data sheet, row address and refresh control circuit may in response to appropriate signals at inputs 150, 154 direct a refresh counter 160 to perform a DRAM refresh. Having described the basic hardware elements of a preferred embodiment of the invention, the process and operation of the system will now be set forth according to this preferred embodiment of the invention which is shown in FIGS. 3A and 3B.

Process Overview

Figure 3A:
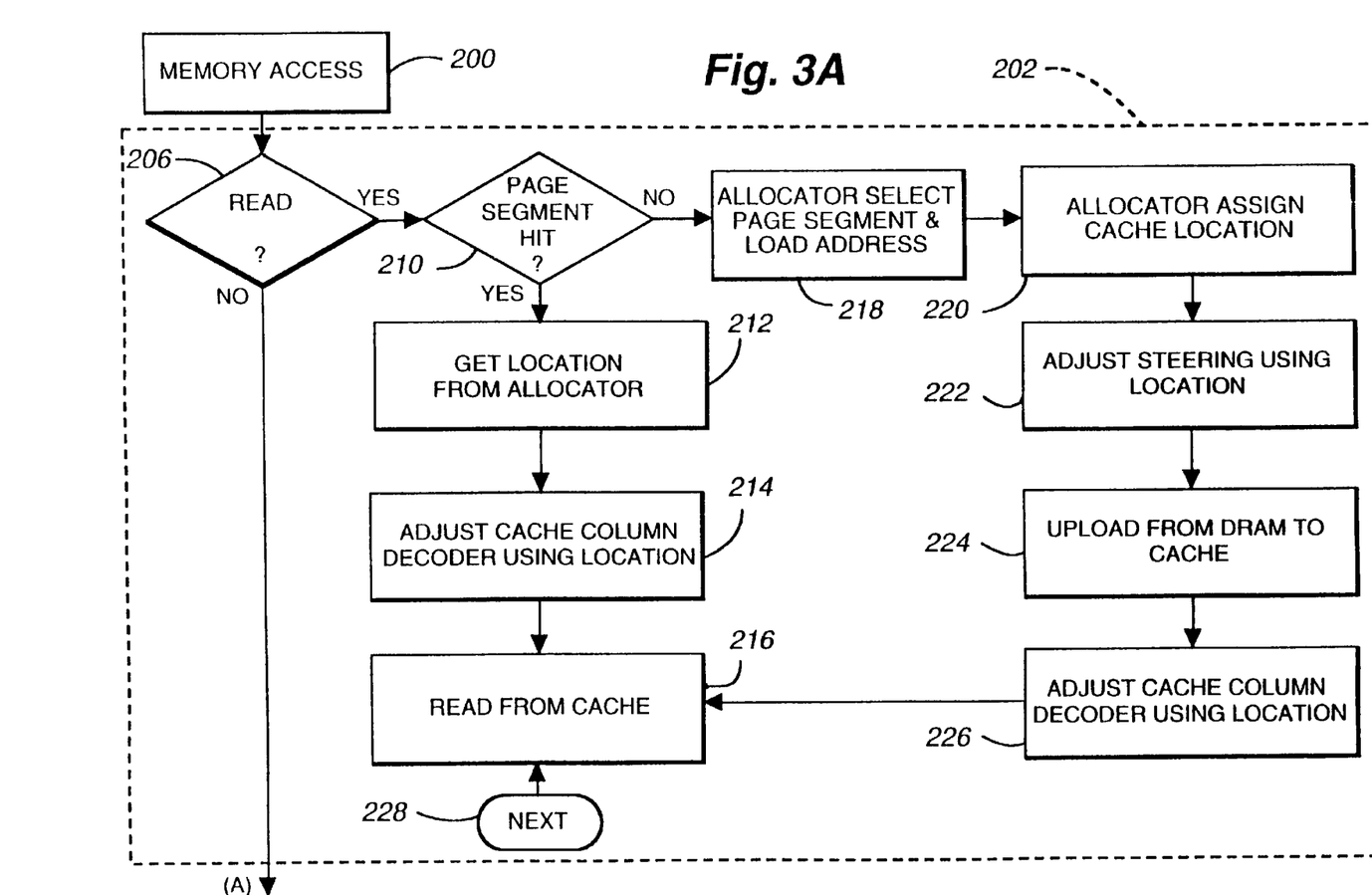
FIGS. 3A and 3B are collectively a process flow diagram showing the handling of memory access requests according to the current invention.
Figure 3B:
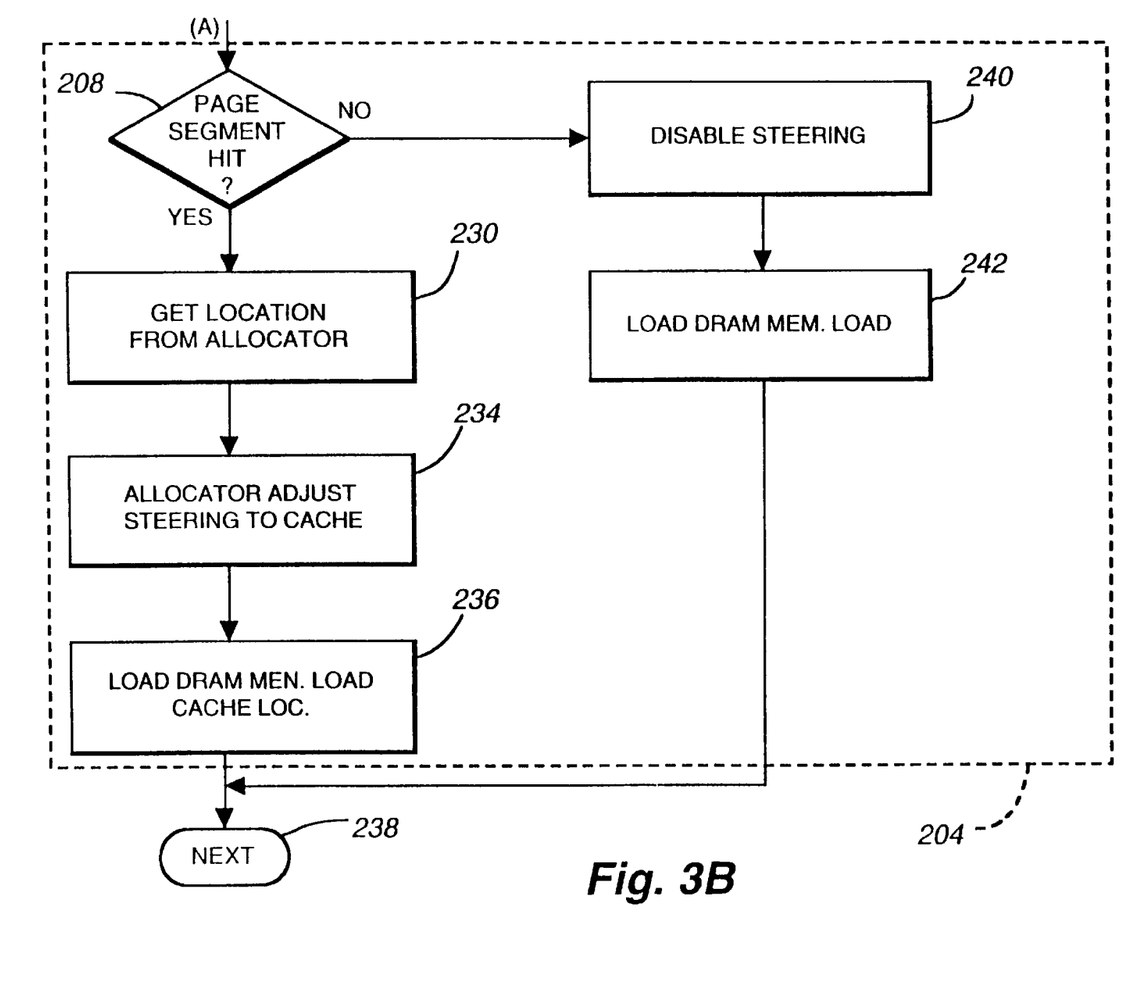

The process connected with a preferred embodiment of the current invention is set forth in FIGS. 3A and 3B. A memory access request 200 initiates the process. Control is turned over to read processing block 202, the first decision process in this block is a decision 206 as to whether the current memory access is a read request. In the event that determination is in the negative, i.e. that the request is a write request, then control is passed to write process block 204 and specifically the first decision step 208. Alternatively, if in decision step 206 it is determined that the current memory access is a read access request, then control is passed to decision step 210, in which a determination is made as to whether a page segment hit is indicated on either of page segment comparators 22 and 24 via signal lines 34 and 36. In the event that there has been a page segment hit, then control is passed to process step 212, in which the location of that page segment in the cache as recorded by either location register 134 and 136 is determined and control is passed to process step 214. In process 214 the cache decoder 46 is adjusted via column adjuster 144. This adjustment process, described above, involves a translation by the column adjuster 144 of the cache location value which has been transferred to adjuster 144 at the direction of allocator 100 from either location register 134 and 136. Having adjusted the column address, control is then passed to process step 216, in which a read from the cache is then enabled.

If alternately in decision step 210 it is determined that neither of page segment comparators 22 and 24 have experienced a page segment hit, then control is passed to process step 218, in which allocator 100 makes a determination as to which of page segment comparators 22 and 24 will have its LRR and LRS latch components replaced with the current page segment request available on multiplex address bus 20.

Simple and Complex Replacement Mode

The replacement determination by allocator 100 may involve any one of several algorithms, each with increasing complexity. The first replacement mode, a simple replacement mode, allocates page segment comparators in toggle order irregardless of the frequency of use or probability of subsequent utilization. Comparators are updated in first in first out (FIFO) order. In the simple replacement mode, if page segment comparator 22 had just had its latch contents updated, then in response to a new memory access request and misses from both page segment comparators, allocator 100 uploads a new address into page segment comparator 24. The second replacement mode, a complex replacement mode, allocates least frequently used cache segments first. Segment comparators that least frequently register hits are replaced first. Alternately, page segment comparators that have the lowest hit-to-miss ratio are replaced first. In either case, cache is replaced on the basis of statistical probabilities. In the complex replacement mode, cache utilization increases since there is likely to be a correlation between frequency of past use and future use of a page segment.

In a preferred implementation of the complex replacement mode, allocator 100 has an internal counter for each comparator. Each counter registers, for its associated comparator, the number of hits on a given page segment. The counter is reset each time a new row segment is latched into a comparator. Using these counter values, the allocator 100 allocates a new row segment, one not currently in any comparator/cache, to the comparator with the lowest counter value, i.e., the lowest number of hits, the least utilization.

Having chosen a page segment comparator to be refreshed, based on either the simple or complex replacement mode, and having loaded the new row and row segment into the latches of that comparator in process 218, control is then passed to process step 220. In process 220 allocator 100 assigns a cache location, in this embodiment either the first 28 or second 30 half of cache 26, to the new row segment. The relationship between a page segment comparator and a cache segment could be fixed or variable at the determination of allocator 100. In the current embodiment it is fixed. However, it may be advantageous to allow for a varied location in cache of the data pointed to by the latch registers of a given comparator. This latter capability allows rows segments that were present in cache in a twisted state, i.e., out of memory order, to be untwisted by the allocator, to allow faster burst mode access.

After allocation of a cache segment, control is passed to process step 222, in which data steering unit 42 is adjusted to pipeline data being written to cache 26 to the appropriate segment of that cache determined by allocator 100. Control is then passed to process step 224, in which the desired row segment, in this case the first (MnA) or second (MnB) row half, is uploaded from DRAM memory array 38 through sense amplifiers 40 and data steering unit 42 to the appropriate cache segment, either 28, 30 of cache 26. The nomenclature MnA, MnB refers to the row of DRAM memory 38 and the segment of that row, A/B in this embodiment. Memory segmentation corresponds to cache segmentation. Control is then passed to process step 226. In process 226 the cache decoder 46 is adjusted via column adjuster 144. This adjustment process, described above, involves a translation by the column adjuster 144 of the cache location value which has been transferred to adjuster 144 at the direction of allocator 100 from either location register 134 and 136. Having adjusted the column address, control is then passed to process step 216, in which a read from the cache is then accomplished in a conventional manner. Control then passes to iteration block 228, which returns control to process 200 and the next memory access.

Alternately, if a write was detected, control passes from decision step 206 to write block 204 and specifically to decision process 208, the first process in write block 204. In decision step 208 a determination is made as to whether a page segment hit was indicated on either comparator 22 and 24. In the event that determination is that there is a page segment hit, then control passes to process step 230. In process step 230, the location in cache corresponding to page segment comparator 22 and 24 which registered the hit is passed by allocator 100 to steering unit 42. Control is then passed to process step 234, in which data steering unit 42 is adjusted to steer data being written to cache 26 to the appropriate segment of that cache determined by allocator 100. Control then passes to process step 236, in which the incoming write data along data line 52 is passed both to DRAM memory array 38 via sense amplifiers 40 in the conventional manner, and additionally, according to this invention, is passed via steering unit 42 to update the appropriate stale cache segment 28, 30, as determined in the above-mentioned manner by allocator 100. Control is then passed to the next iteration block 238 for return to processing of a subsequent memory access in process step 200.

If alternately in decision step 208 a determination was made that a write request did not result in a page segment hit, then control passes to process step 240, in which the allocator 100 disables steering unit 42, since no cache segment was in need of refreshing since none contained stale data, and control is passed to process step 242, in which, in the conventional manner, DRAM array 38 has the contents of data line 52 passed to it via sense amplifiers 40 to update those memory contents. Control is then passed to next iteration block 238 for return of control to memory access process 200.

Read Hardware Processing

Figure 4:
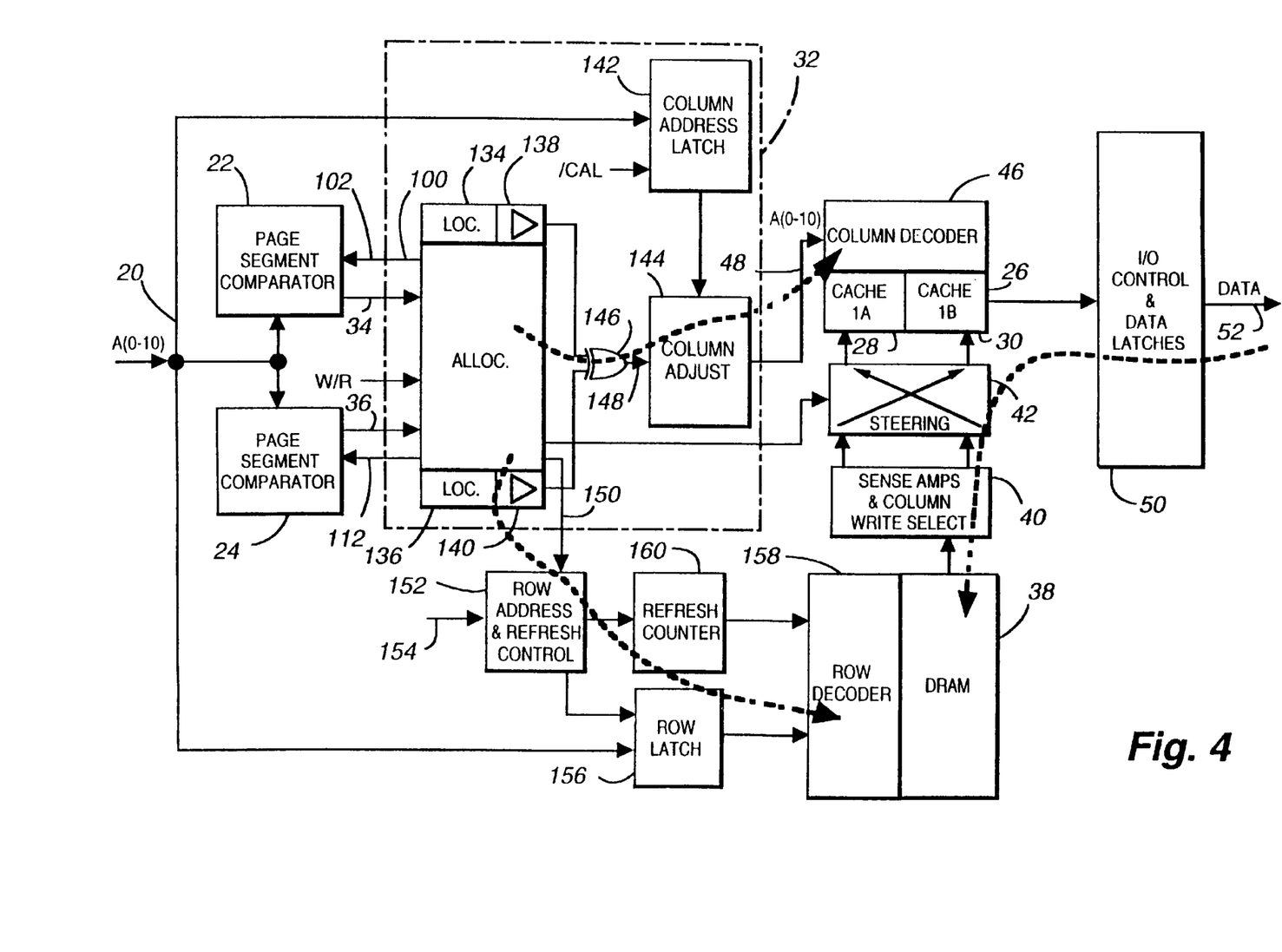
FIG. 4 is a hardware block diagram similar to FIG. 1 showing the processing connected with a Read Hit.

The remaining drawings (FIGS. 4–7) indicate the relationship in this embodiment between the hardware processing of a memory access and the process shown in FIGS. 3A and 3B. Referring now specifically to FIG. 4, in which the hardware process of a read hit indicated on page segment comparator 22 is shown, having recorded a hit in segment comparator 22, allocator 100 downloads the contents of location register 134 via transmission gate 138 through X-OR gate 146 via signal line 148 to column adjust unit 144, thereby assuring subsequent column accesses within this same row segment will access the proper portion 28, 30 of cache 26. Steering unit 44 goes into a tristate mode, since no data uploading is required and the processing of the read hit proceeds with the output through I/O control 50 to data bus 52 of the contents of the appropriate cache segment, in this embodiment segment 28.

Figure 5:
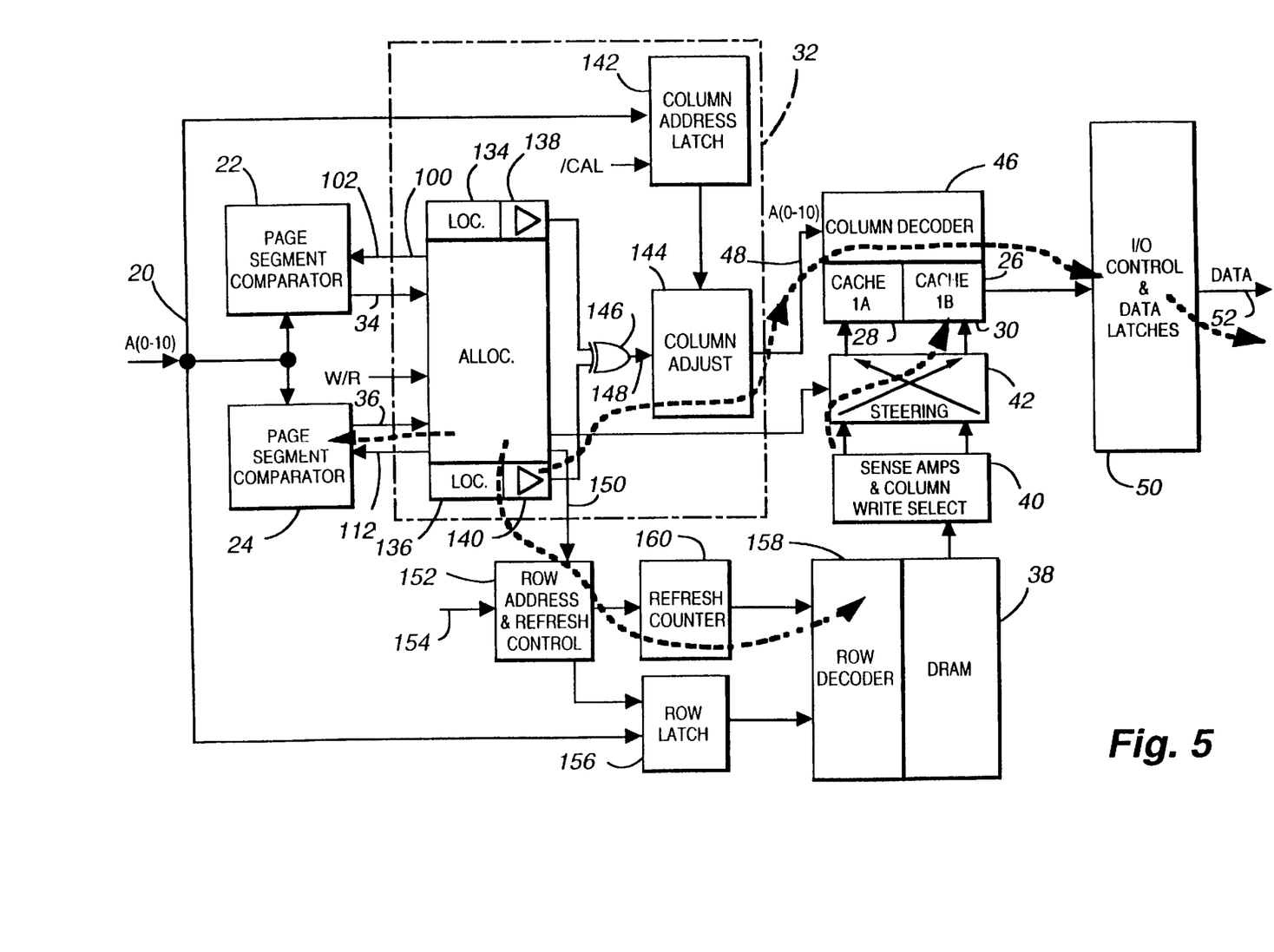
FIG. 5 is a hardware block diagram similar to FIG. 1 showing the processing connected with a Read Miss.

The processing of a read miss at a hardware level is shown generally in FIG. 5. Both page segment comparators 22 and 24 have indicated via signal lines 34, 36 to allocator 100 that a miss has been experienced, in other words, that the current row and column segment present on address bus 20 does not correspond to the contents of either cache segment 28, 30. In this instance, allocator 100 chooses, according to the simple or complex replacement algorithms discussed above, the appropriate page segment comparator, in this page segment comparator 24, into which to upload row and row segment information. That row and row segment is latched into, in this case, last row read latch 114 and last row segment latch 116, in response to an upload signal sent from allocator 100 along upload signal line 112. Subsequently, allocator 100 assigns a location to this new row segment and loads that location into location register 136, in this instance. The contents of location register 136 is then passed via transmission gate 140 to X-OR gate 146 and to column adjust unit 144. Additionally, that location information is utilized by allocator 100 to send an appropriate steering signal via steering line 44 to steering unit 42. Allocator 100 also sends out a DRAM access signal along signal line 150 to row address and refresh control 152. Control 152 then, in the conventional manner, directs row latch 156 to lock in the row present on memory address bus 20 and to enable via row decoder 158, the corresponding row 300 of DRAM array 38. Row 300 comprises a first half 302 and a second half 304. With the steering unit enabled, the contents of the first row half 302 of row 300 are then passed through sense amplifiers 40 and steered to the appropriate cache segment, 30 in this instance, by steering unit 42 at the direction of allocator 100 via signal line 44. With the column thus adjusted, in this sense in a positive direction since the contents of the column address latch need to be up-incremented to correct for the fact that a first row half 302 of DRAM memory array 38 was loaded into the second half 30 of cache 26. The column decoder 46 has thus been appropriately adjusted. At this point, in the normal manner as set forth in the above-described data book, the data requested will be output through I/O control 50 from cache segment 30 and provided to the data bus 52.

Write Hardware Processing

Figure 6:
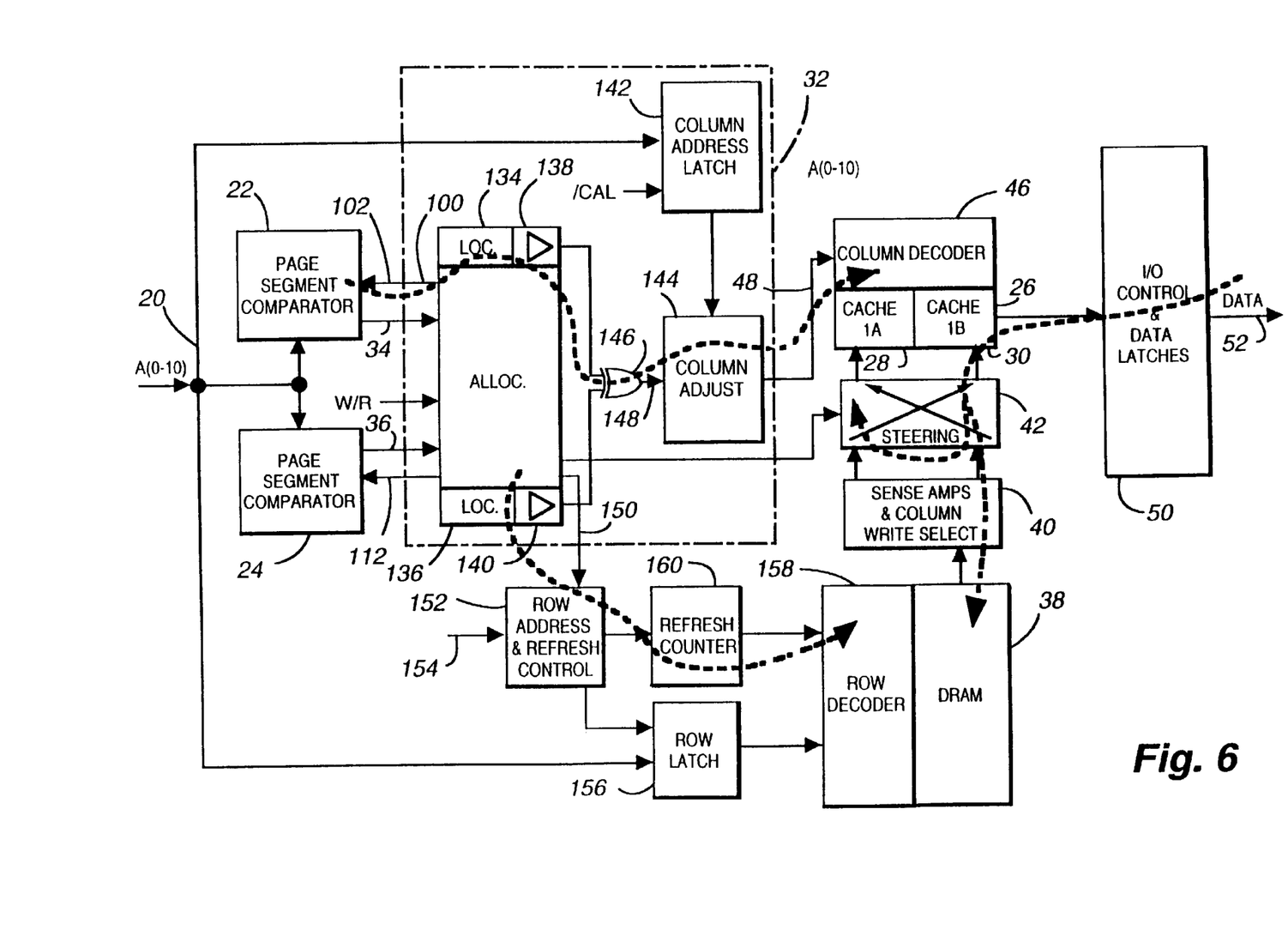
FIG. 6 is a hardware block diagram similar to FIG. 1 showing the processing connected with a Write Hit.

The processing of a write hit is shown in FIG. 6, in which page segment comparator 22 indicates via signal line 34 a hit to allocator 100. Subsequently, allocator 100, utilizing location register 134 outputs via transmission gate 138 through X-OR 146 a column adjustment via signal line 148 to column adjuster 144. Additionally, allocator 100 adjusts steering unit 42 via signal line 44. Since a DRAM memory array access is called for, allocator 100 sends the appropriate signal via signal line 150 to cause row address and refresh control 152 to direct row latch 156 to latch in the current row, on address bus 20. Row decoder 158, thereby enables row 310 of DRAM memory array. Row 310 comprises a first half 312 and a second half 314. The data present on data line 52 is written to row 310. Data bus 52 provides the data to be written to row 310 to I/O control 50, which in turn passes that data to sense amplifier unit 40, at which point the data is written to DRAM memory array 38 row 310 in the conventional manner. Additionally, according to the current invention, the row segment, in this case 314, on which the hit is registered by comparator 22, is passed via steering unit 42 to the appropriate segment 28 of cache. The stale data currently contained in that cache segment is updated so that it corresponds to the data being written to DRAM memory array 38. No column adjustment is necessary since a write is taking place.

Figure 7:
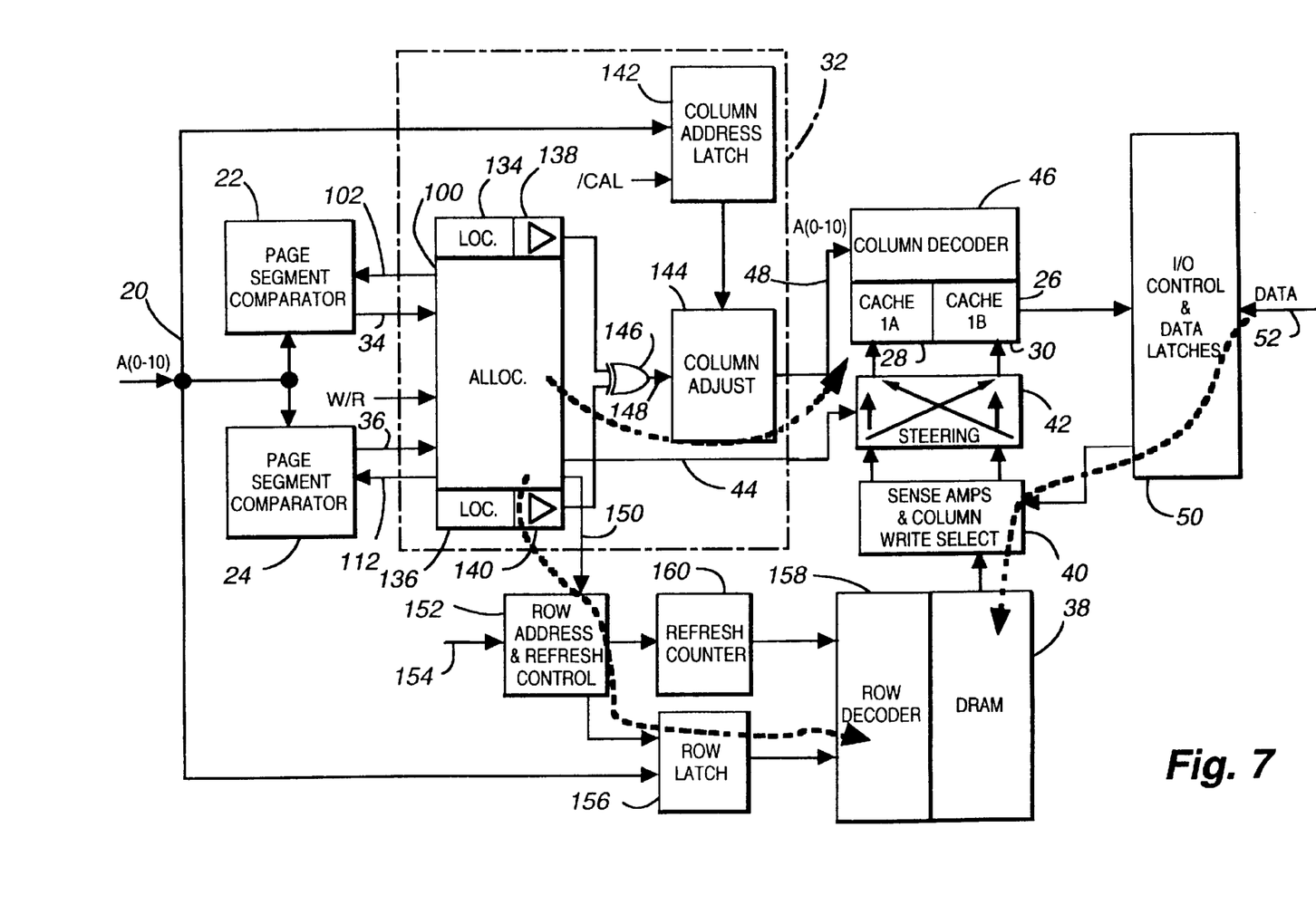
FIG. 7 is a hardware block diagram similar to FIG. 1 showing the processing connected with a Write Miss.

Finally, in FIG. 7, a memory access request resulting in a write miss is shown. Both page segment comparators 22 and 24 have indicated a miss to allocator 100. Allocator 100, sensing that a write miss is being processed, disables or tristates steering unit 42, since no refreshing of cache 26 will be required. Additionally, since a DRAM memory array access is required, allocator 100 outputs the appropriate signal via signal line 150 to row address control 152, which causes latch unit 156 to latch the current row present on address bus 20 into row latch 156. Subsequently column decoder 158 enables that row for a memory access. Write data present on data bus 52 is then passed through I/O control 50 to sense amplifier 40 to be written to the appropriate row in DRAM memory array 38.

This completes the processing connected with the current invention, which makes for much more efficient use of limited cache resources than does the prior art methods of bulk row allocation.

Having described and illustrated the principles of the invention in a preferred embodiment thereof, it is appreciated by those having skill in the art that the invention can be modified in arrangement and detail without departing from such principles. Although the embodiment of the invention herein above described incorporates a multiplexed addressing scheme, those skilled in the art will recognize other methods and circuits for accomplishing the salient principles of the invention. For example, non-multiplexed addressing schemes may readily be employed, as well as other appropriate addressing techniques. We, therefore, claim all modifications and variation coming within the spirit and scope of the following claims.

We claim:

1. Memory apparatus for storing data, the data accessible responsive to a memory access request, tho memory access request identifying data by row and column, said memory apparatus comprising:

a main memory formed of an array of memory elements, the array formed of rows and columns of memory elements;

a cache memory selectably formed of at least one cache segment, the at least one cache segment capable of storing uploaded data uploaded from row segment portions of rows of memory elements of said main memory, data stored in a row of said cache memory selectably of data uploaded from more than one row of said main memory:

at least one comparator coupled to receive indications of the memory access request, said comparator for determining whether data identified in the memory access request is stored in said cache memory;

an allocator operable at least responsive to determinations made by said comparator, said allocator for identifying locations of the at least one cache segment of said cache memory corresponding to the data identified by row and column in the memory access request when said comparator determines the data to be stored in said cache memory, said allocator having a first location register and a second location register which contain information to indicate in which portion of the cache memory that the data resides, a two-input logical exclusive-or gate having a first input coupled to said fixed location register and a second input coupled to said second location register, and to a column adjust register, said two-input logical exclusive-or gate for getting the information contained in said first and second location registers, respectively, to said column adjust register, said column adjust register containing thereby an adjustment value, the adjustment value for allocating portions of the at least one cache segment to be overwritten with data retrieved from said main memory corresponding to the row and column identified in the memory access request when said comparator determines the data not to be store in said cache memory, allocation of the portions of the cache segment to which the data is to be overwritten selected responsive to frequency of utilization of the cache segment, said locator further for steering of the data uploaded from said main memory to said cache memory subsequent to the determination by said comparator that the data is stored in said cache memory.

2. The memory apparatus of claim 1 wherein said comparator determines both which row and which cache segment of the at least one cache segment the data identified in the memory access request and determined to be in said cache memory is located.

3. The memory apparatus of claim 1 wherein said comparator comprises a latch device for latching signal contents representative of locations at which the data identified by the memory access request are to be uploaded from said main memory to said cache memory.

4. The memory apparatus of claim 1 wherein said at least one comparator at least correspond in number with a number of cache segments of which said cache memory is selectably formed.

5. A method for accessing data stored in a memory apparatus responsive to a memory access request which identifies the data requested to be accessed by row and column, said method comprising the steps of:

providing a main memory formed of an array of memory elements, the array formed of rows and columns of memory elements;

selectably uploading data retrieved from row segment portions of rows of memory elements of the main memory provided during said step of providing to be stored in a cache memory, the data uploaded and stored in a row of the cache memory selectably retrieved from more than one row of the main memory;

determining, responsive to the memory access request, whether the data identified in the data access request is stored in the cache memory during said step of selectably uploading;

identifying locations of the cache memory corresponding to the data identified by row and column in the memory access request when a determination is made during said step of determining that the data identified in the memory access request is stored in the cache memory;

allocating portions of the cache memory to be overwritten with data to be retrieved from the main memory corresponding to the row and column identified in the memory access request when a determination is made during said step of determining that the data identified in the memory access request is not stored in the cache memory, the portions of the cache memory selected to be overwritten by providing first and second location register containing information to indicate which portion of the cache memory that the data resides, providing the information contained at the first location register to a first input of a two-input logical exclusive-or gate, providing the information contained at the second location register to a second input of the two-input logical exclusive-or gate, gating the information provided to the two-input logical exclusive-or gate to a column adjust register to form an adjustment value thereat, the adjustment value for allocating the portions of the cache memory to be overwritten with the data, the portions of the cache memory allocated to be overwritten selected responsive to frequency of utilization of the cache segment; and steering the data uploaded from the main memory to the cache memory subsequent to a determination during said operation of determining that the data is not stored in the cache memory.

6. The method of claim 5 further comprising the additional step, prior to said step of steering, of retrieving the data identified in the memory access request from the memory elements of the main memory, and wherein said step of steering comprises the steps of uploading the data retrieved during said step of retrieving to the cache memory, and overwriting the portions of the cache memory allocated during said step of allocating with the data retrieve during said step of retrieving.

7. The method of claim 5 wherein the cache memory is divided into a first cache segment and at least a second cache segment and wherein the locations of the cache memory identified during said step of identifying identify both which row and which of the first and at least second cache segment, respectively, in which the data identified in the memory access request is stored.

* * * * *